United States Patent [19]

Loucks et al.

[11] 4,260,733

[45] Apr. 7, 1981

[54] METHOD FOR MAKING AROMATIC POLYFORMALS

[75] Inventors: George R. Loucks; Frank J. Williams, III, both of Scotia, N.Y.

[73] Assignee: General Electric Company, Schenectady, N.Y.

[21] Appl. No.: 889,397

[22] Filed: Mar. 23, 1978

[51] Int. Cl.³ .............................................. C08G 65/40
[52] U.S. Cl. .................................... 528/219; 528/126; 528/128; 528/174; 528/205
[58] Field of Search ..................... 260/49, 47 R, 61; 528/219, 174, 126, 128, 205

[56] References Cited

U.S. PATENT DOCUMENTS 3,069,386   12/1962   Barclay, Jr. .......................... 260/49

Primary Examiner—Lester L. Lee
Attorney, Agent, or Firm—William A. Teoli; James C. Davis, Jr.

[57] ABSTRACT

A method is provided for making linear film forming aromatic polyformals having a reduced percent by weight of aromatic polyformals in the cyclic state. Reduced cyclic polyformal content in the linear aromatic polyformal is achieved by a filtration of the reaction product of a bisphenol and methylene halide in the presence of an alkali metal hydroxide, followed by the addition of an antisolvent to the reaction mixture to effect reverse precipitation.

10 Claims, No Drawings

METHOD FOR MAKING AROMATIC POLYFORMALS

BACKGROUND OF THE INVENTION

The present invention relates to a method for making aromatic polyformals. More particularly, the present invention relates to a method for eliminating cyclic polyformal from film forming aromatic polyformal.

As shown in copending application of Allan S. Hay, Ser. No. 889,393, now abandoned, filed concurrently herewith and assigned to the same assignee as the present invention, aromatic polyformal consisting essentially of chemically combined units of the formula, $$-OROCH_2-, \qquad (1)$$

is made by reacting a bisphenol, methylene halide, alkali metal hydroxide in combination with a dipolar aprotic solvent, or in an organic solvent utilizing a phase transfer catalyst, where R is a $C_{(6-30)}$ divalent aromatic radical defined more particularly below. It has been found that in the process of forming and recovering such aromatic polyformal from the aforementioned reaction mixture, the aromatic polyformal often has a substantial percent by weight aromatic polyformal in the cyclic state. In particular instances, the utility of films derived from the film forming aromatic polyformal can be reduced as a result of the presence of cyclic aromatic polyformal; the films can be hazy and have a reduced Notched Izod Impact value.

SUMMARY OF THE INVENTION

The present invention is based on the discovery that if the above described aromatic polyformal reaction mixture is filtered, prior to the recovery of the aromatic polyformal by standard precipitation procedures, and an antisolvent such as acetone, methanol, or mixture thereof, is added to the filtrate in a controlled manner, followed by washing the resulting precipitate with an acetone-methanol solvent mixture, that aromatic polyformal can be recovered having as little as 1% or less of aromatic polyformal in the cyclic state.

Radicals induced by R of formula I are, $C_{(6-30)}$ divalent aromatic radicals, for example, phenylene, tolylene, xylylene, naphthalene, etc.; halogenated derivatives of such divalent aromatic hydrocarbon radicals, such as chlorophenylene, bromotolylene, etc., divalent radicals, such as $-R^1QR^1$, where $R^1$ is selected from $C_{(6-13)}$ divalent aromatic radicals, Q can be cyclohexyl, fluorenyl, $-O-$, $-S-$,

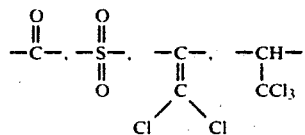

and $-C_yH_{2y}-$ and y is equal to 1 to 5 inclusive.

DESCRIPTION OF THE INVENTION

There is provided by the present invention, a method for making a film forming aromatic polyformal consisting essentially of chemically combined units of formula (1) which is substantially free of aromatic polyformal in the cyclic state which comprises (A) agitating a mixture containing as essential ingredients bisphenol of the formula, $$HO-R-OH, \qquad (2)$$

methylene halide, alkali metal hydroxide and a member selected from the class consisting of a phase transfer catalyst and a dipolar aprotic solvent, where there is utilized in the reaction mixture per mole of bisphenol, more than 1 mole of methylene halide and greater than 2 moles of alkali metal hydroxide, (B) diluting the resulting mixture of (A) with at least 0.5 part by weight of an inert organic solvent, per part of the mixture of (A)

(C) filtering the resulting solution of (B), (D) while agitating the solution of (C), adding at least 0.5 part by weight of an antisolvent, per part of the solution of (C), to effect the precipitation of aromatic polyformal, and (E) recovering the aromatic polyformal from (D), where R is as previously defined.

Included by the bisphenols or mixtures thereof of formula (2) which can be used in the practice of the method of the present invention, are
2,2-bis(4-hydroxyphenyl)propane (Bisphenol-A);
2,2-bis(4-hydroxyphenyl)hexafluoropropane;
4,4'-methylene(2,6-di-tert-butylphenol);
2,4'-dihydroxydiphenylmethane;
bis-(2-hydroxyphenyl)methane;
1,1-bis(4-hydroxyphenyl)ethane;
1,1-bis(4-hydroxyphenyl)propane;
2,2-bis-(4-hydroxyphenyl)pentane;
3,3-bis-(4-hydroxyphenyl)pentane;
4,4'-dihydroxybiphenyl;
4,4'-dihydroxy-3,3',5,5'-tetramethylbiphenyl;
hydroquinone;
resorcinol;
9,9'-bis(4-hydroxyphenyl)-fluorene
3,4'-dihydroxydiphenylmethane;
4,4'-dihydroxybenzophenone;
4,4'-dihydroxydiphenylether;
2,2'-(4-hydroxyphenyl)-1,1-dichloroethylene;
2,2-bis(4-hydroxy-3-methylphenyl)propane;
2,2-bis(4-hydroxy-3,5-dimethylphenyl)propane;
1,1-bis(4-hydroxyphenyl)cyclohexane;
1,1-bis(4-hydroxy-3,5-dimethylphenyl)cyclohexane;
1,1-bis(4-hydroxy-3-methylphenyl(cyclohexane;
bis(4-hydroxy-3,5-dimethylphenyl)sulfone;
5-chloro-2,4'-dihydroxydiphenylsulfone;
4,4'-dihydroxytriphenyl ether;
4,4'-dihydroxy-2,5'-dimethyldiphenyl ether, etc.

Methylene halides which can be used in the practice of the invention are, for example, methylene chloride, methylene bromide, chlorobromo methane, etc. Alkali metal hydroxides which can be employed in the practice of the invention are, for example, potassium hydroxide which can be in the form of pellets, powder, etc., sodium hydroxide, etc.

In the practice of the invention, the aromatic polyformal can be made by effecting contact at a temperature of 0° C. to 100° C. and preferably 40° C. to 100° C., between methylene halide and bisphenol in the presence of alkali metal hydroxide. Reaction can be conducted between excess methylene halide and bisphenol until the latter has been completely reacted.

Reflux temperatures at atmospheric pressure or above atmospheric pressure can be used along with agitation of the mixture. Reaction between methylene methylene halide, organic solvent in combination, which can be employed in the methylene halide are, for example, chlorobenzene, dichlorobenzene, benzene, toluene, etc. In addition, there can be used dipolar aprotic solvents, such as N-methylpyrrolidone, sulfolane, dimethylsulfoxide, etc.

Experience has shown that when methylene halide is employed in the absence of a dipolar aprotic solvent, effective results are achieved if a phase transfer catalyst used to facilitate in situ formation of the alkali salt of the bisphenol and the subsequent condensation reaction with the methylene halide. Suitable phase transfer catalysts are, for example, quaternary ammonium salts, such as described in JACS...

It has been found that the aromatic polyformal can be isolated as a particulate having a high bulk density, such as 0.2 to 0.25 g/ml, as distinguished from the product obtained which can have a bulk density of from 0.05 to 0.07 g/ml and be stringy rather than in a particulate form. It has been found that under reverse precipitation conditions, linear aromatic polyformal can be isolated having as little as from 3 to less than about 1 percent by weight of cyclic aromatic polyformal, based on the weight of the aromatic polyformal.

The substantially cyclic-free aromatic polyformal has been found to be convertible to clear films having able impact properties by standard procedures. These are fabricated to...

parts of sodium hydroxide pellets. The mixture was refluxed for 5 hours. An aliquot was removed (sample A) and analyzed by liquid chromatographic analysis. Another aliquot was removed (sample B) which was added directly to methanol. The remainder of the mixture was diluted with chlorobenzene to produce a 5% solution. This solution was then reverse precipitated using methanol (sample C) and a 50—50 acetone/methanol mixture (sample D). The respective samples (B-D) were dried and then washed with acetone utilizing about 4 parts of acetone, per 1 part of sample. All of the samples were then analyzed by liquid chromatography to determine the percent by weight of cyclics. The following results were obtained, where "IV" is intrinsic viscosity in chloroform at 25° C. and "% Cyclics (after acetone wash)" represents the percent by weight of cyclic aromatic polyformal, based on the total weight of the sample.

| Sample | IV | % Cyclics | % Cyclics (after acetone wash) |
|---|---|---|---|
| A |  | 7.8 |  |
| B | 0.62 | 6.6 | 4.7 |
| C | 0.61 | 2.2 | 1.4 |
| D | 0.61 | 1.6 | 0.98 |

The above results show that the original aromatic polyformal A had 7.8% cyclics. The direct precipitation of the sample into methanol, sample B, improved the product slightly, while the reverse precipitation effected a significant removal of cyclics.

EXAMPLE 3

A mixture of 453.5 parts of bisphenol-A, 4.59 parts of p-tert-butylphenol, 825 part of reagent grade methylene chloride and 966 parts of N-methylpyrrolidone was stirred under nitrogen until a homogeneous solution was obtained. There was then added 169.8 parts of 97% sodium hydroxide pellets under a nitrogen blanket and the mixture exothermed to 37° C. The mixture was then refluxed for 5 hours. After hour 1 hour, a considerble amount of a white precipitate began to form and a slight increase in viscosity was noted. After a 2 hour period, the reaction mixture was very viscous. Aliquots were removed after 3 and 4 hours. At 5 hours, the mixture was cooled slightly and diluted with about 8,800 parts of chlorobenzene to give a 5% solution.

The mixture was then allowed to cool to room temperature and settle over night. The mixture was then filtered and the solids were washed with an additional 1,600 parts of chlorobenzene during the filtration to produce a 5% solution. The resulting filtrate was then acidified with acetic acid to produce a haze-free solution. While the polymer solution was rapidly agitated, an equal volume of a methanol/acetone solution was added over a period of about 10 minutes. The walls of the blender were then scraped and rinsed off and stirring continued for an additional 5 minutes. This procedure was repeated until all of the solution had been treated with the methanol/acetone solution. The resulting solid was then filtered and dried in a 65° C. vacuum oven. There was obtained a total of 440.8 parts, a 96% yield, of a bisphenol-A polyformal, having an intrinsic viscosity of 0.565 in chloroform at 25° C. and consisting essentially of chemically combined units of the formula,

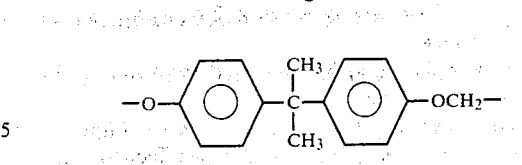

and chain terminated with

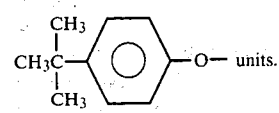 units.

A mixture of 429.8 parts of the above aromatic polyformal and about 1700 parts of acetone was stirred for 20 minutes in an attempt to further reduce the cyclic level. There was obtained 410.41 parts of bisphenol polyformal having an intrinsic viscosity of 0.57 and a cyclic content of 0.78%, based on liquid chromatographic analysis.

The above polyformal was dissolved in methylene chloride to produce a 10% solution. It was cast onto a glass substrate to produce a flexible transparent film. A sample was injection molded to give a test sample having a Notched Izod Impact value of at least 1.0. Those skilled in the art would know that the polymer is a potentially useful engineering thermoplastic having a variety of applications.

EXAMPLE 4

Example 3 was repeated, except that methylene chloride was substituted for chlorobenzene to dilute the reaction mixture. A solution was filtered through Celite on a glass frit and was then passed through glass wool before the reverse precipitation step. There was obtained a bisphenol-A polyformal having an intrinsic viscosity of 0.525 and 0.89% by weight cyclics and a $T_g$ of 90° C. It was injection moldable and had a Notched Izod Impact value of 1.

Although the above examples are directed to only a few of the very many variables which can be employed in the practice of the method of the present invention, it should be understood that the present invention is directed to a much broader class of aromatic polyformals substantially free of cyclic polyformals.

What we claim as new and desire to secure by Letters Patent of the United States is:

1. A method for making a film forming aromatic polyformal consisting essentially of chemically combined units of the formula,

—OROCH$_2$—, which is substantially free of aromatic polyformal in the cyclic state which comprises (A) agitating a mixture containing as essential ingredients bisphenol of the formula,

HO—R—OH, methylene halide, alkali metal hydroxide and a member selected from a phase transfer catalyst and dipolar aprotic solvent, where there is utilized in the reaction mixture, per mole of bisphenol, more than 1 mole of methylene halide and greater than 2 moles of alkali metal hydroxide, (B) diluting the resulting mixture of (A) with an inert organic solvent, (C) effecting the separation of solids from the resulting solution of (B)

(D) while agitating the solution of (C), adding an antisolvent to the solution of (C), to effect the precipitation of aromatic polyformal, and (E) effecting the recovery of aromatic polyformal solids from (D) by a solid-liquid separation, where R is a $C_{(6-30)}$ divalent aromatic radical.

2. A method in accordance with claim 1, wherein the bisphenol is 2,2-bis(4-hydroxyphenyl)propane.

3. A method in accordance with claim 1, where the bisphenol is 2,2'-(4-hydroxyphenyl)-1,1-dichloroethylene.

4. A method in accordance with claim 1, where the antisolvent is a mixture of methanol and acetone.

5. A method in accordance with claim 1, where the dipolar aprotic solvent is N-methylpyrrolidone.

6. A method in accordance with claim 1, where the methylene halide is methylene chloride.

7. A method in accordance with claim 1, where there is utilized a chain-stopper in the mixture of (A).

8. A method in accordance with claim 1, where the aromatic polyformal is recovered as a high bulk density particulate.

9. A method in accordance with claim 1, where the recovered aromatic polyformal is washed with additional antisolvent.

10. A method for making aromatic polyformal consisting essentially of chemically combined units of the formula,

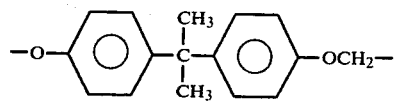

which comprises (F) agitating a mixture containing as essential ingredients bisphenol-A, methylene chloride, sodium hydroxide and N-methylpyrrolidone, where there is utilized in the mixture, per mole of bisphenol-A, more than 1 mole of methylene chloride and greater than 2 moles of sodium hydroxide, (G) diluting the resulting mixture of (F) with chlorobenzene, (H) filtering the resulting solution of (G), (I) while agitating the resulting solution of (H), adding a methanol/acetone solution to effect the precipitation of the aromatic polyformal and (J) recovering the aromatic polyformal of (I).

* * * * *